United States Patent [19]

Yamazaki et al.

[11] Patent Number: 4,469,401
[45] Date of Patent: Sep. 4, 1984

[54] OPTICAL FIBER UNIT FOR OPTICAL SUBMARINE CABLES

[75] Inventors: Yoshihiko Yamazaki, Yokohama; Hitoshi Yamamoto, Yamato; Kahei Furusawa, Kamifukuoka; Yoshihiro Ejiri, Tokyo; Makoto Nunokawa, Kawasaki, all of Japan

[73] Assignee: Kokusai Denshin Denwa Kabushiki Kaisha, Tokyo, Japan

[21] Appl. No.: 379,081

[22] Filed: May 17, 1982

[30] Foreign Application Priority Data

May 21, 1981 [JP] Japan ................... 56-75676

[51] Int. Cl.³ .............................................. G02B 5/16
[52] U.S. Cl. .............................................. 350/96.23
[58] Field of Search ............... 350/96.23, 96.30, 588

[56] References Cited

U.S. PATENT DOCUMENTS

| 3,865,466 | 2/1975 | Slaughter | 350/96.23 X |
| 4,274,709 | 6/1981 | Asai | 350/96.30 X |
| 4,341,205 | 7/1982 | Hosono et al. | 350/588 X |
| 4,365,865 | 12/1982 | Stiles | 350/96.23 |

FOREIGN PATENT DOCUMENTS 2741331  3/1979  Fed. Rep. of Germany ... 350/96.23

*Primary Examiner*—John D. Lee
*Assistant Examiner*—Akm E. Ullah
*Attorney, Agent, or Firm*—Robert E. Burns; Emmanuel J. Lobato; Bruce L. Adams

[57] ABSTRACT

An optical fiber unit for optical submarine cables, in which glass portions formed by a plurality of optical fibers each having at least one coating layer and twisted together at a required pitch are embedded in a resin layer. Adjacent two layers of the coating layer and the resin layer are formed of the same material or materials which satisfy the following condition;

$$\frac{E_1}{E_2} > \frac{1-\nu_1}{1-\nu_2}$$

where $E_1$ is the Young's modulus of the inner one of the two layers, $E_2$ is the Young's modulus of the outer one of the two layers, $\nu_1$ is the Poisson's ratio of the inner one of the two layers and $\nu_2$ is the Poisson's ratio of the outer one of the two layers, the thus coated portion being formed over the entire length of the optical fibers or at desired intervals.

4 Claims, 6 Drawing Figures

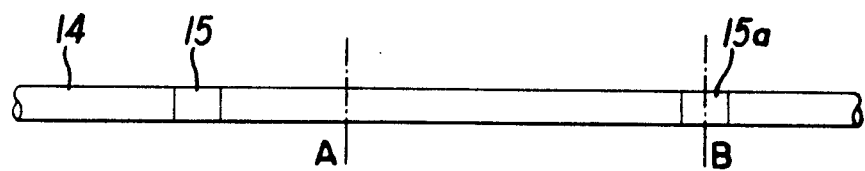
FIG. 5A
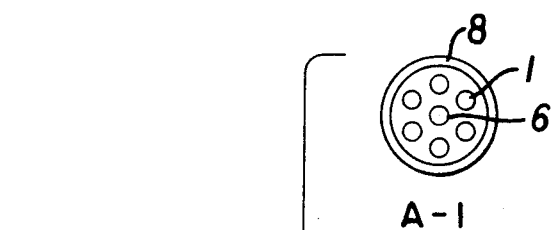
FIG. 5B
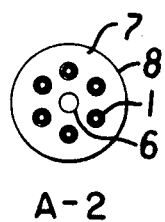
A-1
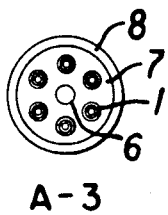
A-2
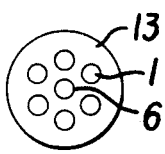
A-3
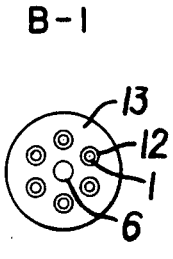
B-1
B-2

OPTICAL FIBER UNIT FOR OPTICAL SUBMARINE CABLES

BACKGROUND OF THE INVENTION

The present invention relates to an optical fiber unit structure for use in an optical submarine cable system.

An optical fiber submarine cable must be designed so that the transmission and mechanical characteristics of the optical fiber used as a transmission medium may not deteriorate for as long a time as 20 years or more. To meet this requirement, it is usual practice in the art to house the optical fiber in a pressure resisting structure to protect it from a sea water pressure as high as 800 atmospheres.

In optical fiber submarine cables, the optical fibers are normally protected from sea water as described previously but, when the cable is broken through an accident, sea water enters into the cable. To avoid this, it has been proposed, for instance, to fill up a gap between the optical fiber unit and the pressure resisting structure with a jelly-like substance. However, sea water also enters into the optical fiber unit from its end portion.

SUMMARY OF THE INVENTION

It is an object of the present invention to provide a highly reliable and economical optical fiber unit which is capable of preventing penetration of water thereinto.

In accordance with the present invention, there is provided an optical fiber unit for optical submarine cables in which glass portions formed by a plurality of optical fibers each having at least one coating layer and twisted together at a required pitch are embedded in a resin layer, characterized in that adjacent two layers of the coating layer and resin layer are formed of the same material or material which satisfy the following condition;

$$\frac{E_1}{E_2} > \frac{1-\nu_1}{1-\nu_2}$$

where $E_1$ is the Young's modulus of the inner one of the two layers, $E_2$ is the Young's modulus of the outer one of the two layers, $\nu_1$ is the Poisson's ratio of the inner one of the two layers and $\nu_2$ is the Poisson's ratio of the outer one of the two layers, the thus coated portion is formed over the entire length of the optical fiber or at desired intervals.

BRIEF DESCRIPTION OF THE DRAWINGS

The present invention will be described in detail below in comparison with conventional arts with reference to the accompanying drawings, in which:

FIG. 5A is a schematic side view explanatory of another embodiment of the present invention; and FIG. 5B shows cross-sectional views explanatory of other embodiments of the present invention.

DETAILED DESCRIPTION

Figure 1:
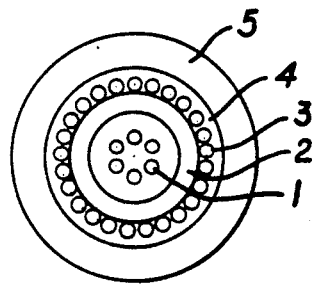
FIG. 1 is a cross-sectional view of a conventional submarine cable.
Figure 2:
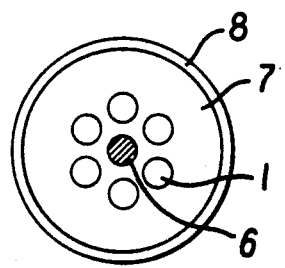
FIG. 2 is a cross-sectional view showing the construction of a conventional optical fiber unit.

A description will be given first of a conventional optical fiber submarine cable with reference to FIG. 1. In FIG. 1, reference numeral 1 indicates optical fibers; 2 designates a pressure resisting structure; 3 identifies tension wires; 4 denotes a power supplying feeder; and 5 represents an insulator as of polyethylene. Such a submarine cable employs a unit structure in which the plural optical fibers 1 are twisted together at a fixed pitch relative to one another and burried in a coating so as to prevent local generation of force by fixing them relative to one another and to permit them to stretch following the elongation of the cable. FIG. 2 shows an example of a prior art optical fiber unit structure. Reference numeral 1 indicates a plurality of optical fibers; 6 designates a tension wire or central interstitial core for arrangement of the optical fibers around it; 7 identifies a buffer layer as of silicone resin; and 8 denotes a nylon coating layer. In a case of the optical fiber unit structure of FIG. 2, sea water enters between the nylon coating layer 8 and the silicone buffer layer 7 and between the optical fibers 1 and the silicone buffer layer 7. It has been reported that when the optical fiber is immersed in sea water, the mechanical strength of the optical fiber is lowered by the action of Na ions or OH ions. Accordingly, when repairing the fault cable, it is necessary that the portion soaked in sea water be replaced by a new one, resulting in a great economic loss. None of the conventional optical fiber units for the optical submarine cable has been designed from such a standpoint.

Figure 3:
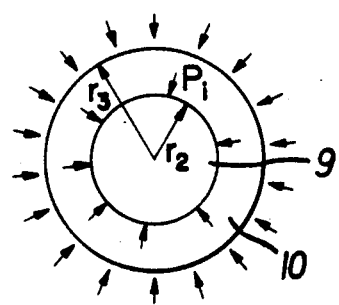
FIG. 3 is a schematic diagram explanatory of the principle of the present invention.

Now, a description will be given of the principle of the present invention. Now let it be assumed that a column 9 of a radius $r_2$ and a cylinder 10 of an inner radius $r_2$ and an outer radius $r_3$ are combined in contact with each other as shown in FIG. 3, and that the column 9 is formed of a material having a Young's modulus $E_1$ and a Poisson's ratio $\nu_1$ and the cylinder 10 a material having a Young's modulus $E_2$ and a Poisson's ratio $\nu_2$. When an external pressure $P_0$ is applied to the outer periphery of the combination column, a pressure $P_i$ exerted on the periphery of the column 9 is expressed as follows:

$$P_i = \frac{\frac{1}{E_2} \cdot \frac{2r_3^2}{r_3^2 - r_2^2}}{\frac{1}{E_1}(1-\nu_1) + \frac{1}{E_2}\left(\frac{r_3^2 + r_2^2}{r_3^2 - r_2^2} + \nu_2\right)} \cdot P_0 \quad (1)$$

Accordingly, $$\frac{1}{E_2}(1-\nu_2) > \frac{1}{E_1}(1-\nu_1) \quad (2)$$

Modifying it to $$\frac{E_1}{E_2} > \frac{1-\nu_1}{1-\nu_2} \quad (3)$$

it follows that $$P_i > P_0.$$

That is to say, a compressive force larger than the external pressure is applied to the inner column 9. In this case, the Poisson's ratio of substance takes a value in the range of 0 to 0.5, and hence it fluctuates a little with the quality of the material used, but the Young's modulus widely varies. Accordingly, since a maximum value of the right side of Eq. (3) is 2, if the inner column 9 is made of a material of the Young's modulus $E_1$ more than twice higher than the Young's modulus $E_2$ of the outer cylinder 10, then it is possible to prevent sea water from entering through the gap between the inner column 9 and the outer cylinder 10 because a compressive stress larger than the external pressure is exerted on the outer periphery of the inner column 9 when hydraulic pressure is applied also. Moreover, in a case where the cylinder has a multi-layer construction, if the interrelation of materials of adjacent layers satisfy the condition of Eq. (3), then it is possible to prevent penetration of water into the fiber unit through the gap between the adjacent layers. By applying this principle, an optical fiber unit can be obtained which is free from penetration of water thereinto in case of a cable fault.

Figure 4:
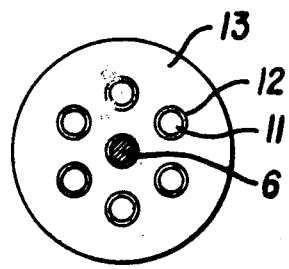
FIG. 4 is a cross-sectional view illustrating an embodiment of the present invention.

FIG. 4 illustrates an optical fiber unit produced as an embodiment of the present invention. In FIG. 4, reference numeral 6 indicates a central interstitial core disposed for constituting the unit; 11 designates glass portions of optical fibers; and 12 identify primary coatings colored for identifying the individual optical fibers. The coatings are each formed so that the Young's modulus of the coated optical fiber may be more than twice as large as the Young's modulus of a coating layer 13 on the outside thereof. By making the primary coating 12 and the outer coating layer 13 of exactly the same material, the portion of the column 9 in FIG. 3 can be regarded as the glass portion of the optical fiber. Consequently, penetration of water can be avoided on the same principle as described previously. For example, in a case where the outer coating layer 13 is made of silicone resin, the primary coating 12 is made of polyvinylidene fluoride, epoxy resin, urethane resin or the like but it may also be formed of exactly the same silicone resin as the outer coating layer. When the outer coating layer 13 is formed of nylon, the primary coating 12 is made of fluoride resin or the like. Table 1 shows the Young's modulus E and the Poisson's ratios $\nu$ of the abovesaid materials for the coatings.

TABLE 1

|   | E | $\nu$ |
|---|---|---|
| Quartz glass | $7.3 \times 10^5$ kg/cm$^2$ | 0.17 |
| Nylon | 9600 kg/cm$^2$ | 0.4 |
| Polyvinylidene fluoride | 14000 kg/cm$^2$ | 0.4 |
| Silicone resin | 12 kg/cm$^2$ | 0.5 |
| PE | 7700 kg/cm$^2$ | 0.458 |

The outer coating layer 13 is filled up by arranging a plurality of fibers covered with the primary coatings 12 about the central interstitial core 6 while twisting them together at a certain pitch. In this case, in order to completely fill up the unit, it is also possible to fill up the outer coating 13 while twisting together fibers which are previously given thin outer coatings 13 around the primary coatings 12. The central interstitial core 6 may also be an optical fiber. Further, classification of the primary coatings by coloring allows great ease in connecting the optical fibers.

As described above, an optical fiber unit which does not allow penetration of water over its entire length in case of a cable fault can be constituted by covering the optical fibers with the primary coatings which adhere closely thereto, and then coating them with exactly the same material as the primary coatings or a material whose Young's modulus is smaller than one-half that of the primary coatings. In actual optical fiber units for the submarine cable, a low optical loss and accommodation of extra length of fibers resulting from elongation of the cable are also important factors. In view of this, it is desirable that the outer coating be formed of a pliable material of small Young's modulus which produces a buffer effect more than does the primary coating, such as silicone resin, for instance. The silicone resin is also large in frictional force, so that, when employed in the cable, it adheres closely to the pressure resisting structure of the cable and transmits well the elongation of the cable to the fiber unit. The intertwined optical fibers go down towards the central interstitial core as the fiber unit stretches, by which elongation of the fibers can be absorbed. In this regard, it can be also expected that such a pliable elastic material as silicone resin hightens this effect. From the viewpoints of handling and side pressure, however, it is desirable that unadhesive hard resin, such as nylon, polyethylene, teflon, be on the surface of the optical fiber unit rather than the silicone resin. In this optical fiber unit, however, there is the possibility of water entering into the unit over the entire length of one repeater section in case of fault; therefore, if a coating structure for preventing penetration of water is produced in one repeater section at regular intervals (for instance, several kilometers), then it is sufficient to replace by a new one the fiber unit of only the section into which water has entered in case of fault. For instance, one repeater section of the optical submarine cable is about 50 kilometers, but since it is customary to sequentially splice optical fibers several kilometers long and reinforce the spliced points. If the spliced points are reinforced by molding, for example, nylon, then penetration of water can be checked at those points. For the reinforcement of the spliced points, it is also possible to form the primary coating of nylon, epoxy or like resin of large Young's modulus and reinforce it by using silicone resin as the secondary coating. Moremover, if the strength of the spliced portion is improved as by etching of the glass surface and becomes unrelated to the kind of coating, penetration of water into the fiber unit can also be prevented by entirely covering the spliced portions directly with silicone resin. It is also possible, of course, to cover the optical fiber unit, for instance, silicone or nylon alone not only at the spliced points but also at regular intervals during manufacture of the optical fiber unit.

FIG. 5 illustrates, by way of example, the arrangement of such an optical fiber unit. FIG. 5A shows an optical fiber unit 14 in its lengthwise direction, reference numerals 15 and 15a indicating the coated portions for preventing penetration of water into the optical fiber unit. Examples of fiber unit structures, as viewed in cross section on the line A, are shown by sections A-1 to A-3 in FIG. 5A, and examples of the fiber unit structures, as viewed in cross section on the line B, are shown by sections B-1 and B-2 in FIG. 5B. The section A-1 shows the conventional optical fiber unit depicted in FIG. 2, the section A-2 a unit in which the optical fibers 1 covered with nylon are formed as a unitary structure using silicone resin 7, and the section A-3 a unit in which the optical fiber assembly covered with the silicone resin 7 in the section A-2 is further covered with a nylon coating layer 8. On the other hand, the section B-1 shows a structure in which the optical fibers 1 (glass) are entirely covered with the same coating 13 of nylon or silicone resin, and the section B-2 a structure in which the optical fibers (glass) 1 are each given a primary coating 12 (of large Young's modulus, for instance, nylon, epoxy or fluoride resin) and are covered with a secondary coating 13 of a material having a small Young's modulus (for example, silicone resin). With such arrangements, even if a fault occurs, for instance, in the vicinity of the point A in FIG. 5A, it is sufficient to replace the section 15-15a alone; therefore, a very economical optical fiber unit can be obtained.

As has been described in the foregoing, according to the present invention, optical fibers are each given a primary coating of a material of large Young's modulus and are covered with a secondary coating of the same material as the primary coating or a material whose Young's modulus is smaller than one-half that of the latter, by which it is possible to obtain an economical and reliable optical fiber unit which prevents water from entering thereinto in case of fault.

While in the foregoing the Young's modulus $E_2$ of the secondary coating of the outer one of adjacent layers is described to be smaller than one-half the Young's modulus $E_1$ of the primary coating of the inner layer, the Young's modulus $E_2$ need not always be smaller than one-half that $E_1$ taking into account their Poisson's ratios $\nu_1$ and $\nu_2$, if the relation of Eq. (3), $$\frac{E_1}{E_2} > \frac{1-\nu_1}{1-\nu_2},$$

is satisfied.

What we claim is:

1. An optical fiber unit for optical submarine cables, in which glass portions formed by a plurality of optical fibers each having at least one coating layer and twisted together at a required pitch are embedded in a resin layer, characterized in that adjacent two layers of the coating layer and the resin layer are formed of materials which satisfy the following condition;

$$\frac{E_1}{E_2} > \frac{1-\nu_1}{1-\nu_2}$$

where $E_1$ is the Young's modulus of the inner one of the two layers, $E_2$ is the Young's modulus of the outer one of the two layers, $\nu_1$ is the Poisson's ratio of the inner one of the two layers and $\nu_2$ is the Poisson's ratio of the outer one of the two layers, the thus coated portion being formed over the entire length of the optical fibers or at desired intervals.

2. An optical fiber unit according to claim 1, in which the Young's modulus of the coating layer is larger than twice the Young's modulus of the resin layer.

3. An optical fiber unit according to claim 1, in which the resin layer is of silicone resin and the coating layer is of any one of the group consisting of polyvinylidene fluoride, epoxy resin and urethane resin.

4. An optical fiber unit according to claim 1, in which the resin layer is of nylon and the coating layer is of fluoride resin.

* * * * *